US010522826B2

(12) United States Patent
Lee et al.

(10) Patent No.: US 10,522,826 B2
(45) Date of Patent: Dec. 31, 2019

(54) MANGANESE OXIDE NANO-RODS IN THE FORM OF A CORE-SHELL, A METHOD FOR PRODUCING THE SAME, AND AN ACTIVE MATERIAL FOR A SECONDARY BATTERY COMPRISING THE SAME

(71) Applicant: Korea Basic Science Institute, Daejeon (KR)

(72) Inventors: Jin Bae Lee, Daejeon (KR); Hae Jin Kim, Daejeon (KR); Won Gi Hong, Daejeon (KR); Sang Moon Lee, Daejeon (KR); Yeon Ho Kim, Daejeon (KR)

(73) Assignee: KOREA BASIC SCIENCE INSTITUTE, Daejeon (KR)

( * ) Notice: Subject to any disclaimer, the term of this patent is extended or adjusted under 35 U.S.C. 154(b) by 52 days.

(21) Appl. No.: 15/818,635

(22) Filed: Nov. 20, 2017

(65) Prior Publication Data

US 2018/0175381 A1    Jun. 21, 2018

(30) Foreign Application Priority Data

Dec. 16, 2016    (KR) ........................ 10-2016-0172953

(51) Int. Cl.
*H01M 4/36* (2006.01)
*H01M 4/50* (2010.01)
*H01M 4/02* (2006.01)

(52) U.S. Cl.
CPC ............. *H01M 4/366* (2013.01); *H01M 4/50* (2013.01); *H01M 2004/021* (2013.01)

(58) Field of Classification Search
CPC ........ H01M 4/366; H01M 4/50; H01M 4/502; H01M 2004/021; C01G 45/02;
(Continued)

(56) References Cited

FOREIGN PATENT DOCUMENTS

CN        104209119 A    12/2014

OTHER PUBLICATIONS

Arthur et al. (ACS Appl. Mater. Interfaces 2014, 6, 7004-7008) (Year: 2014).*
(Continued)

*Primary Examiner* — Wojciech Haske
(74) *Attorney, Agent, or Firm* — Womble Bond Dickinson (US) LLP (57) ABSTRACT

The present disclosure relates to manganese oxide nano-rods in the form of a core-shell, in which the manganese oxide nano-rods are formed in a core-shell structure, the core and the shell each include $Mn_xO_y$, when x of $Mn_xO_y$ of the core is 1 and y is 2, x of $Mn_xO_y$ of the shell is 2 and y is 3, and when x of $Mn_xO_y$ of the core is 2 and y is 3, x of $Mn_xO_y$ of the shell is 1 and y is 2. According to the present disclosure, in the secondary battery using the manganese oxide, the elution of manganese is inhibited and the structural stability of an active material is increased, thereby increasing the capacity and the cycle life at a high temperature.

6 Claims, 5 Drawing Sheets

Shell-$MnO_2$, Core-$Mn_2O_3$ (58) Field of Classification Search
CPC .............. C01P 2002/72; C01P 2004/03; C01P 2004/04; C01P 2004/16; C01P 2004/64; C01P 2004/84
See application file for complete search history.

(56) References Cited

OTHER PUBLICATIONS

Saputra et al., "Egg-shaped core/shell a-Mn2O3@a-MnO2 as heterogeneous catalysts for decomposition of phenolics in aqueous solutions", Chemosphere, vol. 159, 2016, pp. 351-358.
Feng et al., "MnO2 prepared by hydrothermal method and electrochemical performance as anode for lithium-ion battery", Nanoscale Research Letters, vol. 9, 290, 2014, pp. 1-8.

\* cited by examiner

Shell-MnO$_2$, Core-Mn$_2$O$_3$

Shell-MnO$_2$, Core-Mn$_2$O$_3$

MANGANESE OXIDE NANO-RODS IN THE FORM OF A CORE-SHELL, A METHOD FOR PRODUCING THE SAME, AND AN ACTIVE MATERIAL FOR A SECONDARY BATTERY COMPRISING THE SAME

CROSS-REFERENCE TO RELATED APPLICATIONS

This application claims the benefit under 35 U.S.C. 119(a) of Korean Patent Application No. 10-2016-0172953 filed on Dec. 16, 2016, in the Korean Intellectual Property Office, the entire disclosure of which is incorporated herein by reference for all purposes.

BACKGROUND

Field

The present disclosure relates to manganese oxide nano-rods in the form of a core-shell, a method for producing the same, and an active material for a secondary battery including the same and, more particularly, to manganese oxide nano-rods in the form of a core-shell, where the manganese oxide included in the core and the shell have each different oxidation state, a method for producing the same, and an active material for a secondary battery including the same.

Description of the Related Art

Recently, studies on various types of low-dimensional nanostructures such as carbon nanotubes (CNTs), oxide nanotubes, nanorods, nanowires, nanosheets, nanoribbons, and nano-thick hollow particles (hollow sphere) are actively proceeding. Such a nanostructure is drawing great attention in that not only it is excellent in physical and chemical properties but also the nanostructure itself is a useful basic unit and also can implement various effects of nano materials.

These nanostructures are synthesized by laser ablation, thin film sputtering, chemical vapor deposition or sol-gel method, and the like. In addition, impurities may be added to nanostructures, or the nanostructures may be synthesized to have a two-layered structure, a core-shell structure, and the like, and thus, the characteristics as a device is improved. In addition, the research is being conducted on nano devices comprising field effect transistors (FETs), lasers, chemical sensors, and bio sensors using nanostructures.

On the other hand, manganese oxide is relatively cheap and is superior in thermal stability as compared to the other active materials when overcharged, and causes a low environmental pollution, and thus is an attractive material. However, there is a problem in that it has a small capacity. In addition, $Mn^{3+}$ is eluted from the surface of a manganese-based active material particle during charge and discharge, resulting in disproportionation reaction ($2Mn^{3+} \rightarrow Mn^{4+} + Mn^{2+}$) on a particle surface, which causes defects in an cathode active material. This reaction takes place more actively upon contact with an electrolyte, especially at a high temperature. There is a problem such that as the manganese is eluted due to such a reaction, an active material is collapsed to deteriorate the structural stability, and as a result, the capacity is decreased and the cycle life is deteriorated at a high temperature.

In order to solve this problem, that is, in order to stabilize the structure and improve the high temperature cycle characteristics, the studies about doping metal ions such as $Mg^{2+}$, $Ga^{3+}$, $Al^{3+}$, $Cu^{2+}$ or $Cr^{3+}$ have been conducted. Such doping ions can inhibit the capacity reduction by substituting $Mn^{3+}$ in a manganese-based active material, but the structural stability cannot be effectively improved due to the presence of the $Mn^{3+}$ ion fraction in a spinel structure. As another method, a method of coating the manganese-based active material particles with $Li_2OB_2O_3$, ZnO, $LiCoO_2$ or CoO has been studied in order to improve cycle characteristics at a high temperature. However, this method merely decreases the rate at which Mn is eluted and fails to completely inhibit the Mn elution, thereby not improving the cycle life characteristics.

SUMMARY

The present disclosure has been proposed in order to solve the above problems, and manganese oxide nano-rods in the form of a core-shell where the manganese oxide included in the core and the shell have each different oxidation state is provided.

In addition, a method for producing manganese oxide nano-rods in the form of a core-shell having a simple producing process is provided.

In addition, a novel active material for a secondary battery including manganese oxide nano-rods in the form of a core-shell, where the manganese oxide included in the core and the shell have each different oxidation state is provided.

According to an example of the present disclosure, manganese oxide nano-rods in the form of a core-shell according to the present disclosure, in which the manganese oxide nano-rods are composed of a core-shell form, the core and the shell each include $Mn_xO_y$, when x of $Mn_xO_y$ of the core is 1 and y is 2, x of $Mn_xO_y$ of the shell is 2 and y is 3, and when x of $Mn_xO_y$ of the core is 2 and y is 3, x of $Mn_xO_y$ of the shell is 1 and y is 2.

Herein, the mass ratio of $Mn_xO_y$ included in the core and the shell may fall within a range of 10:1 to 10:4.

Herein, the manganese oxide nano-rods in the form of a core-shell may have a particle diameter ranging from 20 to 50 nm.

Herein, the thickness of the shell of the manganese oxide nano-rods in the form of a core-shell may fall within a range of 1 to 10 nm.

According to another example of the present disclosure, a method for producing manganese oxide nano-rods in the form of a core-shell of the present disclosure includes: preparing a mixture by mixing a manganese oxide precursor and a block copolymer; stirring the mixture to produce a stirred material; heat-treating the stirred material at 80 to 180° C. for 24 to 96 hours to form a reactant in the form of a core-shell; and sintering the reactant in the form of a core-shell, in which the stirring the mixture to produce a stirred material is performed under a magnetic field.

Herein, the manganese oxide precursor may be one or more kinds selected from the group consisting of manganese nitrate, manganese sulfate, manganese pernitrate, manganese dioxide, and manganese peroxide.

Herein, the block copolymer may include polyethylene glycol and polypropylene glycol.

Herein, the stirring the mixture to produce a stirred material may be performed in a magnetic field of 1,000 to 5,000 gauss for 1 to 10 hours.

According to another example of the present disclosure, an active material including manganese oxide nano-rods in the form of a core-shell, in which the manganese oxide nano-rods are formed in a core-shell structure, the core and the shell each include $Mn_xO_y$, when x of $Mn_xO_y$ of the core is 1 and y is 2, x of $Mn_xO_y$ of the shell is 2 and y is 3, and when x of $Mn_xO_y$ of the core is 2 and y is 3, x of $Mn_xO_y$ of the shell is 1 and y is 2.

Herein, the mass ratio of $Mn_xO_y$ included in the core and the shell may fall within a range of 10:1 to 10:4.

Herein, the manganese oxide nano-rods in the form of a core-shell may have a particle diameter ranging from 20 to 50 nm.

Herein, the thickness of the shell of the manganese oxide nano-rods in the form of a core-shell may fall within a range of 1 to 10 nm.

According to the present disclosure, in the secondary battery using the manganese oxide, the elution of manganese is inhibited and the structural stability of an active material is increased, thereby increasing the capacity and the cycle life at a high temperature.

DETAILED DESCRIPTION OF THE DISCLOSURE

Hereinafter, embodiments of the present disclosure will be described in detail with reference to the accompanying drawings.

According to the present disclosure, manganese oxide nano-rods in the form of a core-shell where the manganese oxide included in the core and the shell have each different oxidation state is provided.

Manganese oxide is an active material for a secondary battery which is relatively cheap. In addition, it is the most excellent in thermal stability as compared to the other active materials when overcharged, and causes a low environmental pollution, and thus is an attractive material. However, there is a problem in that it has a small capacity. In addition, during charge and discharge, there is a problem such that the manganese is eluted and an active material is collapsed to deteriorate the structural stability, and as a result, the capacity is decreased and the cycle life is deteriorated at a high temperature.

In addition, the conventional core-shell nano-rods exhibit different reactions to external stimuli due to differences in physical properties between each different materials included in the core and the shell. Thus, there has been a problem that they cause instability at the interface during charge and discharge.

The present disclosure is designed to solve such problem. Manganese oxide nano-rods in the form of a core-shell according to the present disclosure are formed in a core-shell structure, and the core and the shell each include $Mn_xO_y$, when x of $Mn_xO_y$ of the core is 1 and y is 2, x of $Mn_xO_y$ of the shell is 2 and y is 3, and when x of $Mn_xO_y$ of the core is 2 and y is 3, x of $Mn_xO_y$ of the shell is 1 and y is 2.

The manganese oxide nano-rods in the form of a core-shell of the present disclosure exhibit the same reaction to external stimuli because the difference in physical properties between the core and the shell is small, and can inhibit warping phenomenon at the time of shrinkage and expansion due to external stimuli, thereby securing structural stability.

The mass ratio of the $Mn_xO_y$ included in the core and the shell of the present disclosure may fall within a range of 10:1 to 10:4, and preferably 10:1 to 10:2.

The thickness of the shell is increased in proportion to the increase in the mass ratio of $Mn_xO_y$ included in the shell, the thickness of the shell is increased so that the physical properties are declined. On the contrary, when the mass ratio of $Mn_xO_y$ included in the shell is lowered, and there is a problem such as elution of Mn ions. Thus, the above is preferable.

It is preferable that the manganese oxide nano-rods in the form of a core-shell have a particle size in the range of 20 to 50 nm. If the particle size is less than 20 nm, the manganese oxide nano-rods have a high surface energy in proportion to the enlarged surface area, which is not preferable because of thermodynamic instability. If the particle size is greater than 50 nm, the effect is insignificant and is not preferable from the viewpoint of energy.

The thickness of the shell of the manganese oxide nano-rods in the form of a core-shell of the present disclosure may fall within a range of 1 to 10 nm. If the thickness of the shell is less than 1 nm, the physical properties such as strength are deteriorated, and thus there is a problem in that the core cannot be protected. If the thickness of the shell is greater than 10 nm, the effect is insignificant and is not preferable from the viewpoint of energy. Thus, the above range is preferable.

Hereinafter, provided is a method for producing manganese oxide nano-rods in the form of a core-shell.

The method includes preparing a mixture by mixing a manganese oxide precursor and a block copolymer; stirring the mixture to produce a stirred material; heat-treating the stirred material at 80 to 180° C. for 24 to 96 hours to form a reactant in the form of a core-shell; and sintering the reactant in the form of a core-shell, in which the stirring the mixture to produce a stirred material is performed under the condition of a magnetic field induced.

First of all, the preparing a mixture by mixing a manganese oxide precursor and a block copolymer is provided.

The manganese oxide precursor is one or more kinds selected from the group consisting of manganese nitrate, manganese sulfate, manganese pernitrate, manganese dioxide, and manganese peroxide. Manganese nitrate is preferable, but is not limited thereto.

The block copolymer may include polyethylene glycol and polypropylene glycol. Preferably, the block copolymer is a three-block copolymer including polyethylene glycol and polypropylene glycol; but is not limited thereto.

The molecular weight of the block copolymer may determine the oxidation state of the manganese oxide included in the core and the shell.

If the molecular weight of the block copolymer is less than 1,500, the core may include $MnO_2$, and the shell may include $Mn_2O_3$. If the molecular weight of the block copolymer is greater than 1,500, the core may include $Mn_2O_3$, and the shell may include $MnO_2$.

In the present disclosure, as an example, when the molecular weight of the block copolymer is about 2,000, the core may include $Mn_2O_3$, and the shell may include $MnO_2$. In addition, when the block copolymer has about 1,100 molecular weight, the core may include $MnO_2$, and the shell may include $Mn_2O_3$.

Next, the stirring the mixture to produce a stirred material is provided.

The stirring the mixture to produce a stirred material may be carried out at a magnetic field of 1,000 to 5,000 gauss for 1 to 10 hours. If the intensity of the magnetic field is less than 1,000 gauss, there is a problem in that the mixture may not be aligned. If the intensity of the magnetic field is greater than 5,000 gauss, there is a problem in that the structure and the interval of particles may be deformed. Thus, the above range is preferable.

Herein, the reason that the stirring the mixture to produce a stirred material is performed under the condition of a magnetic field induced is that when the mixture is stirred in a magnetic field, due to the interaction among the manganese oxide and the magnetic field and the block copolymer, the manganese oxide is gathered into groups having the same oxidation state and arranged in the form of a core-shell. In addition, the structure and the interval of the particles may be controlled by controlling the direction of the magnetic field and the magnitude of the magnetic field.

In addition, when the core-shell manganese oxide nanorods are produced using the magnetic field, a large amount of nano-rods can be produced.

Next, the stirred material is heat-treated at 80 to 180° C. for 24 to 96 hours to form a reactant in the form of a core-shell. The temperature of 100 to 150° C. for 48 to 72 hours is preferable, but is not limited thereto.

The heat treatment process is performed to increase the crystallinity and yield of the core-shell manganese oxide nano-rods. If the heat treatment temperature is less than 80° C., the growth of the nano-rods is delayed and there is a problem in increasing crystallinity. If the temperature is greater than 180° C., the growth of the nano-rods may be rapid but structurally unstable. Thus, the above range is preferable.

In the present disclosure, the heat treatment process refers to hydrothermal treatment.

The hydrothermal treatment may be carried out in a teflon bomb (hot tub), but is not limited thereto.

Next, the sintering the reactant in the form of a core-shell is provided.

The reactant in the form of a core-shell is completed by performing a sintering step at a temperature of 400 to 600° C. for 1 to 5 hours.

The sintering of the reactant in the form of a core-shell is a process for increasing the binding force of the manganese oxide nano-rods in the form of a core-shell. If the temperature is less than 400° C., sintering is not sufficiently performed. If the temperature is greater than 600° C., the sintering time is shortened, but a twist phenomenon may occur at the interface between the core and the shell. Thus, the above range is preferable.

In the present disclosure, filtration, washing, and drying may be further included before the sintering the reactant in the form of a core-shell.

The filtration may be performed according to a conventional method, but is not limited thereto.

The washing may be performed with an organic solvent, such as ethanol, methanol, and acetone, or distilled water two to three times, but is not limited thereto.

The drying may be performed at 90 to 200° C. for 8 to 15 hours. If the temperature is less than 100° C., the washing solvent may remain. On the contrary, if the temperature is greater than 200° C. deformation of the material synthesized may be caused by high drying temperature.

The present disclosure provides an active material for a secondary battery including manganese oxide nano-rods in the form of a core-shell, in which the manganese oxide nano-rods are formed in a core-shell structure, the core and the shell each include $Mn_xO_y$, when x of $Mn_xO_y$ of the core is 1 and y is 2, x of $Mn_xO_y$ of the shell is 2 and y is 3, and when x of $Mn_xO_y$ of the core is 2 and y is 3, x of $Mn_xO_y$ of the shell is 1 and y is 2.

In the present disclosure, in order to use the manganese oxide nano-rods in the form of a core-shell as an active material for a secondary battery, the method may further include calcinating the manganese oxide nano-rods in the form of a core-shell.

The calcinating the manganese oxide nano-rods in the form of a core-shell may be performed by mixing the manganese oxide nano-rods in the form of a core-shell with a lithium source and heat treating the same at 500 to 800° C. for 1 to 12 hours to form an active material including manganese oxide nano-rods in the form of a core-shell.

The lithium source may include one or more kinds selected from the group consisting of $LiOH \cdot H_2O$, $LiNO_3$, $Li_2CO_3$, $LiCl$, $Li_3PO_4$, and a combination thereof, and LiOH is preferably used, but is not limited thereto.

EXAMPLES

Hereinafter, the present disclosure will be described in further detail with reference to examples according to the present disclosure.

Example 1: Preparation of Manganese Oxide Nano-Rods in the Form of a Core($Mn_2O_3$)-Shell($MnO_2$)

First, 12 g of manganese nitrate and 5 g of polyethylene glycol-polypropylene glycol-polyethylene glycol having a molecular weight of 2,000 were mixed and stirred for 2 hours under a magnetic field to prepare a stirred material.

Next, the stirred material was put into an 80 ml teflon bomb, hydrothermally treated at a temperature of 150° C. for 72 hours, and then a filtrate was prepared to filter off impurities.

The filtrate was washed with ethanol and then dried in an oven at 100° C. for 12 hours.

Next, the dried material was sintered at 500° C. for 2 hours to prepare a manganese oxide nano-rod including a core($MnO_2$)-shell($Mn_2O_3$).

Figure 1:
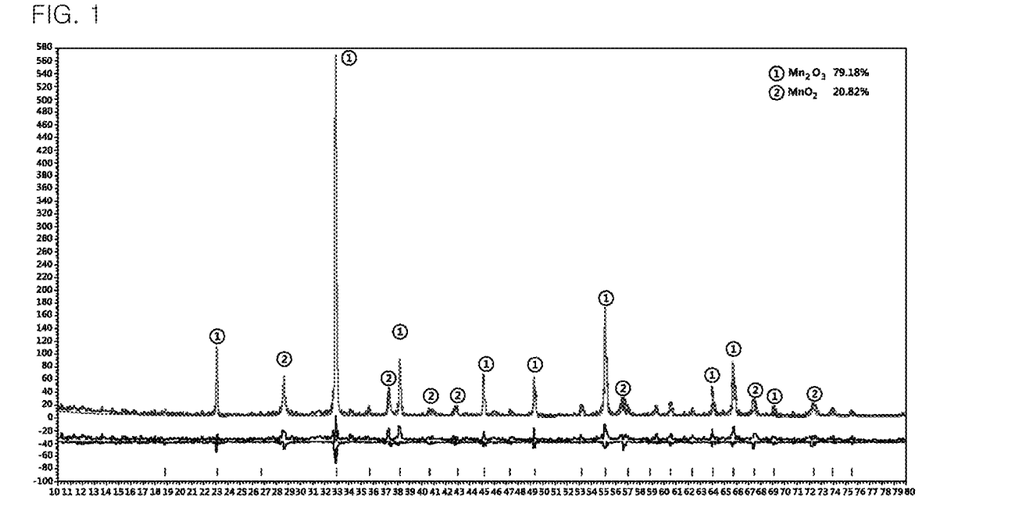
FIG. 1 illustrates the results of X-ray Diffraction (XRD) quantitative analysis of manganese oxide nano-rods in the form of a core($Mn_2O_3$)-shell($MnO_2$) prepared according to Example 1.
Figure 2:
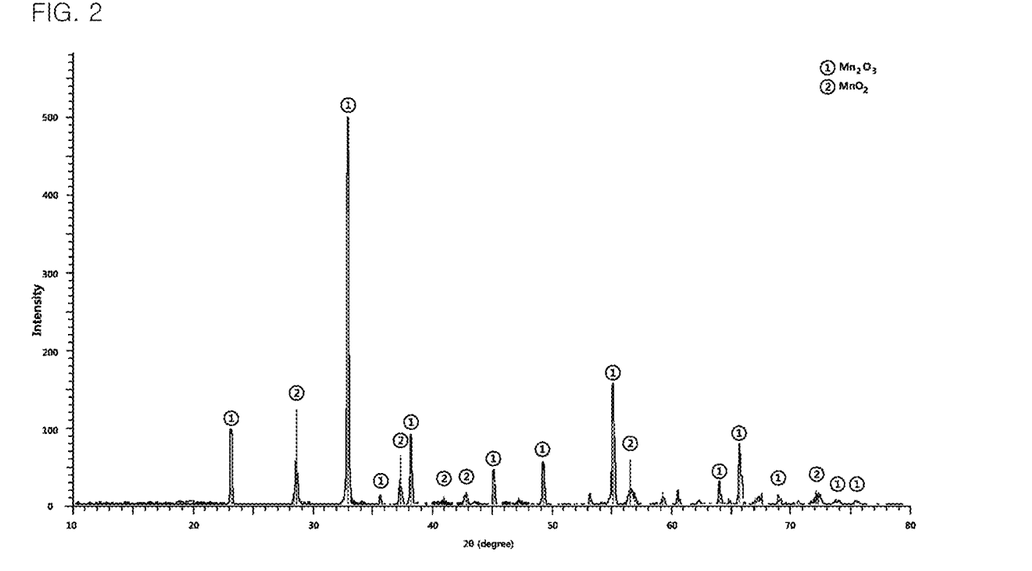
FIG. 2 illustrates the XRD analysis results of Bixbyite-ITO RG of manganese oxide nano-rods in the form of a core($Mn_2O_3$)-shell($MnO_2$) prepared according to Example 1.
Figure 3:
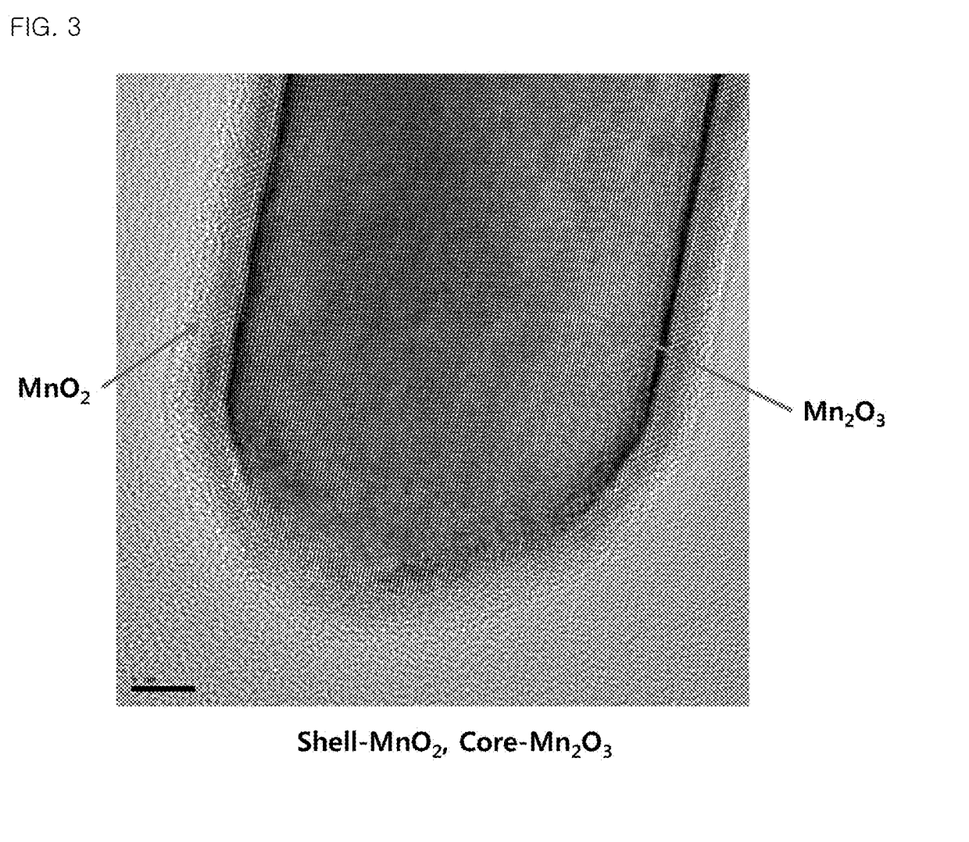
FIG. 3 is a Transmission Electron Microscopy (TEM) image of manganese oxide nano-rods in the form of a core($Mn_2O_3$)-shell($MnO_2$) prepared according to Example 1.
Figure 4:
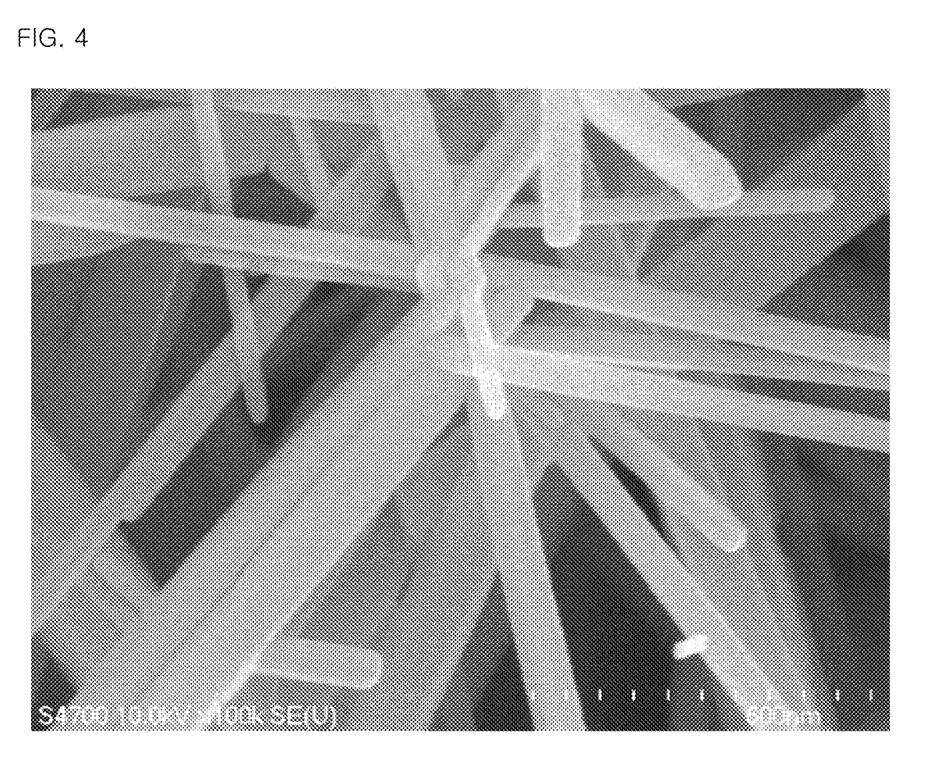
FIG. 4 is a Scanning Electron Microscopy (SEM) image of manganese oxide nano-rods in the form of a core ($Mn_2O_3$)-shell($MnO_2$) prepared according to Example 1.

As illustrated in FIG. 1, it was confirmed that the mass ratio of $Mn_2O_3$ of the core and $MnO_2$ of the shell was 8:2. As illustrated in FIG. 2, it was confirmed that a shell($MnO_2$) in the form of ITO thin film was formed on the core($Mn_2O_3$) of the Bixbyite structure. As illustrated in FIG. 3, it was confirmed that it was manufactured in the form of a core($Mn_2O_3$)-shell($MnO_2$) nano-rods.

Example 2: Preparation of Manganese Oxide Nano-Rods in the Form of a Core($MnO_2$)-Shell($Mn_2O_3$)

First, 12 g of manganese nitrate and 5 g of polyethylene glycol-polypropylene glycol-polyethylene glycol having a molecular weight of 1,100 were mixed and stirred for 2 hours under a magnetic field to prepare a stirred material.

Next, the stirred material was put into an 80 ml teflon bomb, hydrothermally treated at a temperature of 100° C. for 48 hours, and then a filtrate was prepared to filter off impurities.

The filtrate was washed with ethanol and then dried in an oven at 100° C. for 12 hours.

Next, the dried material was sintered at 500° C. for 2 hours to prepare a manganese oxide nano-rod including a core($MnO_2$)-shell($Mn_2O_3$).

Figure 5:
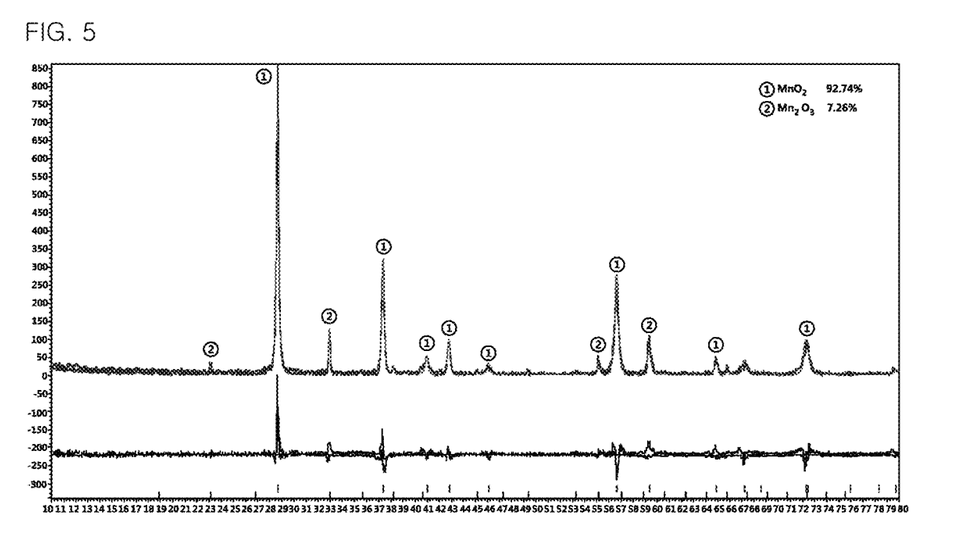
FIG. 5 illustrates the results of XRD quantitative analysis of manganese oxide nano-rods in the form of a core($MnO_2$)-shell($Mn_2O_3$) prepared according to Example 2.
Figure 6:
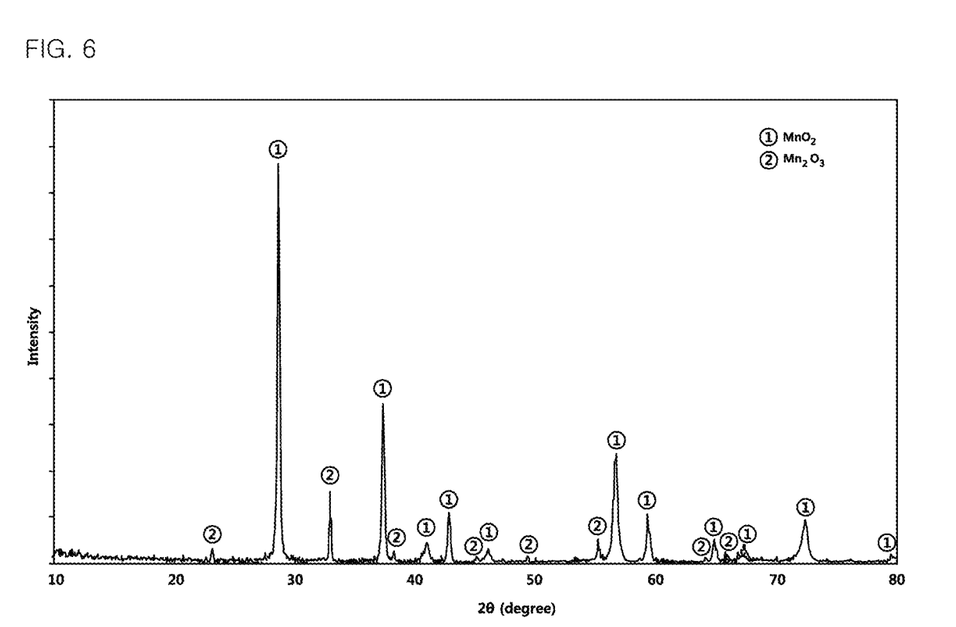
FIG. 6 is an XRD analysis result of Bixbyite-ITO RG of manganese oxide nano-rods in the form of a core($MnO_2$)-shell($Mn_2O_3$) prepared according to Example 2.
Figure 7:
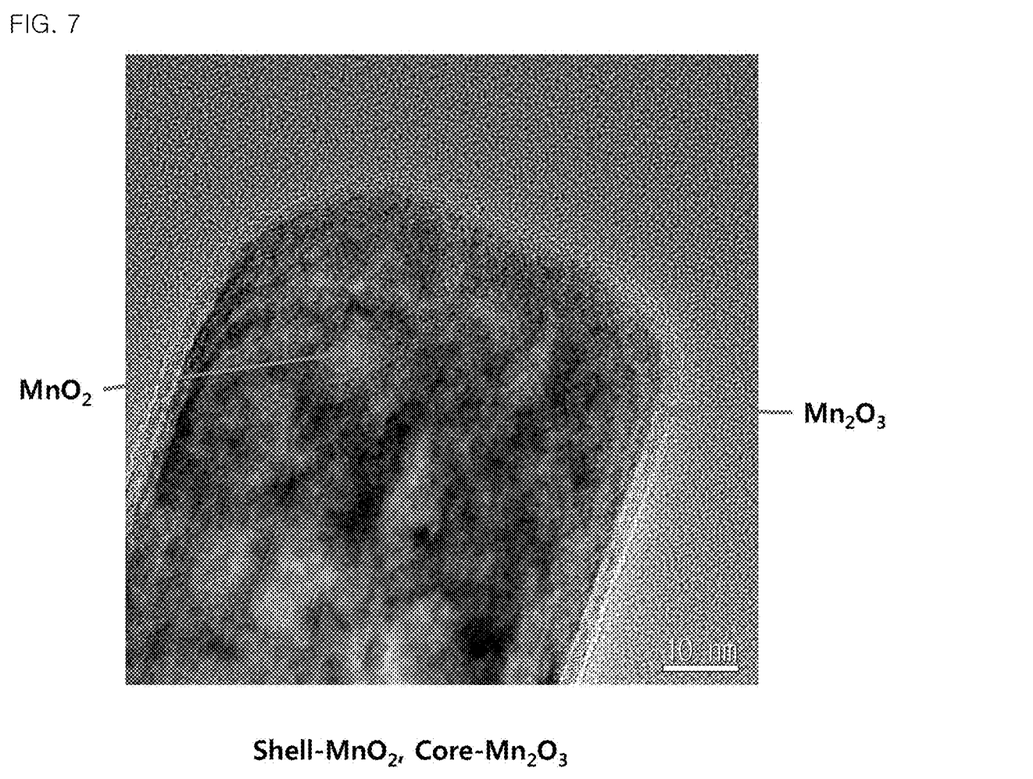
FIG. 7 is a TEM image of manganese oxide nano-rods in the form of a core($MnO_2$)-shell($Mn_2O_3$) prepared according to Example 2

As illustrated in FIG. 5, it was confirmed that the mass ratio of $MnO_2$ of the core and $Mn_2O_3$ of the shell was 9:1. As illustrated in FIG. 6, it was confirmed that a shell ($Mn_2O_3$) in the form of ITO thin film was formed on the core($MnO_2$) of the Bixbyite structure. As illustrated in FIG. 7, it was confirmed that it was manufactured in the form of a core($MnO_2$)-shell($Mn_2O_3$).

Preparation Example 1: Preparation of an Active Material Including Manganese Oxide Nano-Rods in the Form of a Core($Mn_2O_3$)-Shell($MnO_2$)

The manganese oxide nano-rods in the form of a core ($Mn_2O_3$)-shell($MnO_2$) prepared according to Example 1 were mixed with 10 ml of LiOH and calcinated at 700° C. for 2 hours to prepare an active material including manganese oxide nano-rods in the form of a core($Mn_2O_3$)-shell ($MnO_2$).

Preparation Example 2: Preparation of an Active Material Including Manganese Oxide Nano-Rods in the Form of a Core($MnO_2$)-Shell($Mn_2O_3$)

The active material is prepared in the same manner as Preparation Example 1. Instead of the manganese oxide nano-rods in the form of a core($Mn_2O_3$)-shell($MnO_2$) prepared according to Example 1, the manganese oxide nano-rods in the form of a core($MnO_2$)-shell($Mn_2O_3$) prepared according to Example 2 were used to prepare an active material including manganese oxide nano-rods in the form of a core($MnO_2$)-shell($Mn_2O_3$).

From the foregoing, the present disclosure has been described in detail using examples. However, the scope of the present disclosure is not limited by specific examples, but should be interpreted by the appended claims. In addition, it will be appreciated by a person having ordinary skill in the pertinent technical field that various modifications and variations may be made without departing from the scope and spirit of the present disclosure.

What is claimed is:

1. Manganese oxide nano-rods in a form of a core-shell,
    wherein the manganese oxide nano-rods are formed in a core-shell structure,
    the core and the shell each include $Mn_xO_y$,
    when x of $Mn_xO_y$ of the core is 1 and y is 2, x of $Mn_xO_y$ of the shell is 2 and y is 3, and when x of $Mn_xO_y$ of the core is 2 and y is 3, x of $Mn_xO_y$ of the shell is 1 and y is 2,
    wherein a mass ratio of $Mn_xO_y$ included in the core and the shell falls within a range of 10:1 to 10:4.

2. The manganese oxide nano-rods in the form of a core-shell according to claim 1, wherein the manganese oxide nano-rods in the form of a core-shell have a particle diameter ranging from 20 to 50 tire.

3. The manganese oxide nano-rods in the form of a core-shell according to claim 2, wherein a thickness of the shell of the manganese oxide nano-rods in the form of a core-shell falls within a range of 1 to 10 nm.

4. An active material for a secondary battery comprising manganese oxide nano-rods in a form of a core-shell,
    wherein the manganese oxide nano-rods are formed in a core-shell structure,
    the core and the shell each include $Mn_xO_y$,
    when x of $Mn_xO_y$ of the core is 1 and y is 2, x of $Mn_xO_y$ of the shell is 2 and y is 3, and when x of $Mn_xO_y$ of the core is 2 and y is 3, x of $Mn_xO_y$ of the shell is 1 and y is 2,
    wherein a mass ratio of $Mn_xO_y$ included in the core and the shell falls within a range of 10:1 to 10:4.

5. The active material for a secondary battery according to claim 4, wherein the manganese oxide nano-rods in the form of a core-shell have a particle diameter ranging from 20 to 50 nm.

6. The active material for a secondary battery according to claim 5, wherein a thickness of the shell of the manganese oxide nano-rods in the form of a core-shell falls within a range of 1 to 10 nm.

\* \* \* \* \*